Figure 1:
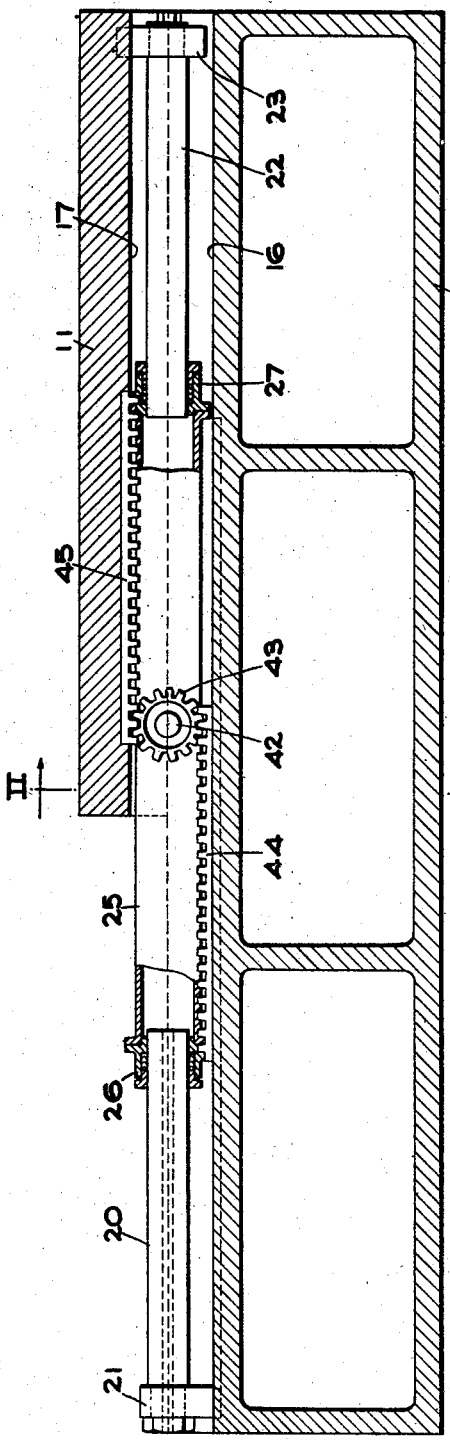

April 6, 1948.  F. E. MUNSCHAUER  2,439,368

MACHINE TOOL

Filed May 22, 1947

INVENTOR
*Frederick E. Munschauer*
BY
*Bean, Brooks, Buckley & Bean.*
ATTORNEYS

Patented Apr. 6, 1948

2,439,368

UNITED STATES PATENT OFFICE 2,439,368

MACHINE TOOL

Frederick E. Munschauer, Buffalo, N. Y., assignor to Niagara Machine & Tool Works, Buffalo, N. Y.

Original application June 1, 1945, Serial No. 597,137. Divided and this application May 22, 1947, Serial No. 749,697

4 Claims. (Cl. 51—233)

This invention relates to reciprocating work tables for machine tools and the like and particularly to fluid operated tables for machines of this class. This application is a division of my co-pending application, Serial No. 597,137, filed June 1, 1945.

Heretofore in this art definite length limitations have existed which prevented satisfactory fluid operation of reciprocating work tables beyond certain stroke lengths, other factors considered. These limitations arise as a result of natural lateral flexural deflection of the parts when unusually long cylinders and pistons or piston rods are employed, deflections sufficient in degree to militate against satisfactory operation of hydraulic piston and cylinder constructions which by their nature must have accurate fluid-tight engagement, not only as between the pistons and cylinders but also as between the piston rods and the cylinder heads.

The present invention provides means whereby sturdy, accurate and wholly satisfactory hydraulic operation may be employed at stroke lengths hitherto deemed impractical and unworkable. The general desirability and advantages of hydraulic drives for machine tool and other reciprocating work tables are well established and recognized and the present invention extends the benefits of this expedient to ranges of operation not previously available.

Other objects and advantages of procedure in accordance with the principles of the present invention will occur to those skilled in the arts involved. While a specific example of the practice of the present invention is illustrated in the drawing and described herein by way of example, it is to be understood that the underlying principles are not limited thereto or otherwise than as defined in the appended claims. In the ensuing description, reference will be had to a surface grinder as one specific example of a machine tool wherein the principles of the present invention may be advantageously employed.

Figure 2:
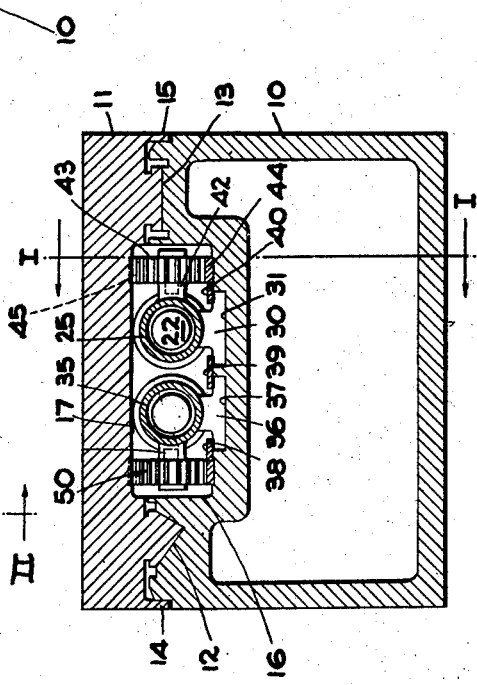

In the drawings:

Fig. 1 is a longitudinal cross sectional view of one form of the apparatus of the present invention taken on line I—I of Fig. 2; and Fig. 2 is a transverse cross sectional view on the line II—II of Fig. 1.

Referring to the embodiment of the invention illustrated in Figs. 1 and 2, the numeral 10 designates a machine bed or base and a reciprocating work table or carriage is designated 11. Only so much of the machine tool as is novel to the present invention is illustrated and described, the remainder being conventional and subject to a wide range of variation in design and arrangement.

The upper surface of bed 10 is formed with ways 12 and 13 and the under side of table or carriage 11 has complementary formations for longitudinal movement along the ways 12 and 13. The table 11 may have longitudinal side flanges 14 and 15 which extend into further guiding engagement with the longitudinal sides of bed 10. Both the upper surface of bed 10 and the under side of table 11 have longitudinally extending well formations, designated 16 and 17, respectively, which cooperate to accommodate the instrumentalities comprising the hydraulic drive means.

For clearness, Fig. 1 shows only the piston and cylinder arrangement which is closest to the plane of the cross section, that being the right-hand cylinder of Fig. 2. However, it is conventional in the hydraulic table feed art to provide equal and opposite cylinder and piston arrangements whereby feeding in both directions is by positive hydraulic pressure. Accordingly, the left-hand piston and cylinder arrangement of Fig. 2 will be a duplicate of the right-hand piston and cylinder arrangement, which is illustrated longitudinally in Fig. 1, excepting that it will be reversed end for end. This general reverse duplicate arrangement is well understood by those skilled in the art and no useful purpose would be served by duplicate illustrations or further explanation.

Referring to Fig. 1, a piston 20 has one end fixed securely with respect to bed 10 at one end thereof by means of a bracket 21 and another piston 22 has its opposite end fixed securely to the opposite end of table 11 as by means of a bracket 23. The free ends of both of the pistons 20 and 22 extend into opposite ends of a cylinder 25 and the opposite ends of the latter have suitably packed heads 26 and 27 for fluid tight sliding engagement with the pistons 20 and 22.

Cylinder 25 is mounted on bed 10 in well 16 for longitudinally guided sliding movement and for that purpose is provided with a laterally flanged base portion 30 which fits in a longitudinal groove 31 formed in the base 10. A similar but oppositely operating cylinder is designated 35 in Fig. 2 and its flanged base, designated 36, fits in a companion groove 37. Retaining rails for the flanged base portions 30 and 36 are designated 38, 39, and 40 in Fig. 2.

Cylinder 25 is provided, substantially midway along its length, with a trunnion 42 which supports a pinion 43 for free rotation. A rack 44 is fixed to bed 10 and a second rack 45 is fixed to table 11, both as shown in Fig. 1, the pinion 43 being in continuous mesh with both racks. The flexible fluid pressure connections which communicate with the interiors of cylinders 25 and 35 and the control valves for establishing back and forth reciprocation by alternating the application of hydraulic pressure are all conventional and need not be further delineated.

From the foregoing it will be seen that the operation of the pinion 43 constrains the cylinder 25 to movement at one-half the rate of movement of table 11 and pistons 20 and 22 will move relatively inwardly and outwardly of cylinder 25 in duplicate manner. With the construction described the two pistons 20 and 22 are about one-half the length that would be required if a single conventional piston were employed, and, what is more important, the free length of each piston, considered as a structural column, is only half of what it would be in the case of a single long piston.

The other cylinder 35 is provided with a similar but oppositely arranged pinion and rack mechanism which is merely designated generally 50 in Fig. 2 and need not be further described.

What is claimed is:

1. In a machine tool, a bed, a work table mounted for guided lineal movement thereon, and drive means for effecting lineal movement thereof, said drive means comprising a cylinder guided for longitudinal movement in the direction of its axis and parallel to the path of movement of said work table, piston means fixed relative to said bed and movable axially in said cylinder, other piston means fixed relative to said work table and movable axially in said cylinder, whereby fluid pressure in said cylinder between said piston means moves the latter relatively apart, gear means carried by said cylinder for free rotation, a rack fixed to said bed and meshing with said gear means, and a second rack fixed to said work table and meshing with said gear means at its opposite side, whereby said cylinder automatically moves along said bed at a rate bearing a fixed fractional relation to the rate of movement of the work table.

2. In a machine tool, a bed, a work table mounted for guided lineal movement thereon, and drive means for effecting lineal movement thereof, said drive means comprising a cylinder guided for longitudinal movement in the direction of its axis and parallel to the path of movement of said work table, piston means fixed relative to said bed and movable axially in said cylinder, other piston means fixed relative to said work table and movable axially in said cylinder, whereby fluid pressure in said cylinder between said piston means moves the latter relatively apart, a pinion carried by said cylinder for free rotation, a rack fixed to said bed and meshing with said pinion, and a second rack fixed to said work table and meshing with said pinion at its opposite side, whereby said cylinder automatically moves along said bed at one-half the rate of movement of the work table.

3. In a machine tool, a bed, a work table mounted for reciprocation thereon, and a pair of opposed drive means for effecting alternate lineal movement thereof in opposite directions, each of said drive means comprising a cylinder guided for longitudinal movement in the direction of its axis and parallel to the path of movement of said work table, piston means fixed relative to said bed and movable axially in said cylinder, other piston means fixed relative to said work table and movable axially in said cylinder, whereby fluid pressure in said cylinder between said piston means moves the latter relatively apart, gear means carried by said cylinder for free rotation, a rack fixed to said bed and meshing with said gear means, and a second rack fixed to said work table and meshing with said gear means at its opposite side, whereby said cylinder automatically moves along said bed at a rate bearing a fixed fractional relation to the rate of movement of the work table.

4. In a machine tool, a bed, a work table mounted for reciprocation thereon, and a pair of opposed drive means for effecting alternate lineal movement thereof in opposite directions, each of said drive means comprising a cylinder guided for longitudinal movement in the direction of its axis and parallel to the path of movement of said work table, piston means fixed relative to said bed and movable axially in said cylinder, other piston means fixed relative to said work table and movable axially in said cylinder, whereby fluid pressure in said cylinder between said piston means moves the latter relatively apart, a rotatable pinion carried by said cylinder for free rotation, a rack fixed to said bed and meshing with said pinion, and a second rack fixed to said work table and meshing with said pinion at its opposite side, whereby said cylinder automatically moves along said bed at one-half the rate of movement of the work table.

FREDERICK E. MUNSCHAUER.